United States Patent
Peters et al.

(10) Patent No.: US 6,463,865 B1
(45) Date of Patent: Oct. 15, 2002

(54) METHOD AND APPARATUS FOR SUBTERRANEAN IMPLANTATION OF A SOIL CONTAINER

(76) Inventors: Marc Russell Peters, 565 Cambria Dr., Campbell, CA (US) 95008; Edward Cranston Howard, 9303 Teichman Rd., Galveston, TX (US) 77554; John Garde Grady, 2025 Rumrill Blvd., San Pablo, CA (US) 94806

( * ) Notice: Subject to any disclaimer, the term of this patent is extended or adjusted under 35 U.S.C. 154(b) by 0 days.

(21) Appl. No.: 09/531,617

(22) Filed: Mar. 21, 2000

(51) Int. Cl.[7] ............................................... A01C 23/02
(52) U.S. Cl. ..................................................... 111/121
(58) Field of Search ............................. 172/19, 20, 21, 172/22, 31, 15, 13, 439; 111/118, 119, 120, 121, 122, 127

(56) References Cited

U.S. PATENT DOCUMENTS

| | | | |
|---|---|---|---|
| 4,232,616 A | * 11/1980 | van der Lely | 111/7 |
| 4,538,532 A | * 9/1985 | Coker | 111/7 |
| 4,872,412 A | * 10/1989 | Zollinger | 111/121 |
| 4,942,833 A | * 7/1990 | Hill et al. | 111/121 |
| 4,987,841 A | * 1/1991 | Rawson et al. | 111/121 |
| 5,370,068 A | * 12/1994 | Rawson et al. | 111/121 |
| 5,467,723 A | * 11/1995 | McIvor-Dean et al. | 111/123 |
| 6,138,590 A | * 10/2000 | Colburn, Jr. | 111/118 |

* cited by examiner

Primary Examiner—Christopher J. Novosad
(74) Attorney, Agent, or Firm—Clifford A. Poff

(57) ABSTRACT

A method and apparatus for implanting a soil conditioner such as a water-absorbing substance into the soil underlying a grass or turf surface. The apparatus includes narrow vertical blades rotatably supported by the apparatus for creating deep notches extending to the soil for which perceptibility is limited and a dispensing system having tubes which are aligned with the blades to deliver the substance into the soil via the deep notches created by the blades. A drive assembly links a blade shaft supporting the blades with a feed bar slidably supported in a container channel to convert rotation of the blade shaft into reciprocated sliding of the feed bar to periodically bring openings in the feed bar into confronting relationship with openings in the container channel. A hitch assembly provides three lift points for attachment of a hoist to lift the apparatus for transport and includes a rearwardly extending strut for resisting moment created by distance between center of gravity of the apparatus and the location of the three lift points.

12 Claims, 5 Drawing Sheets

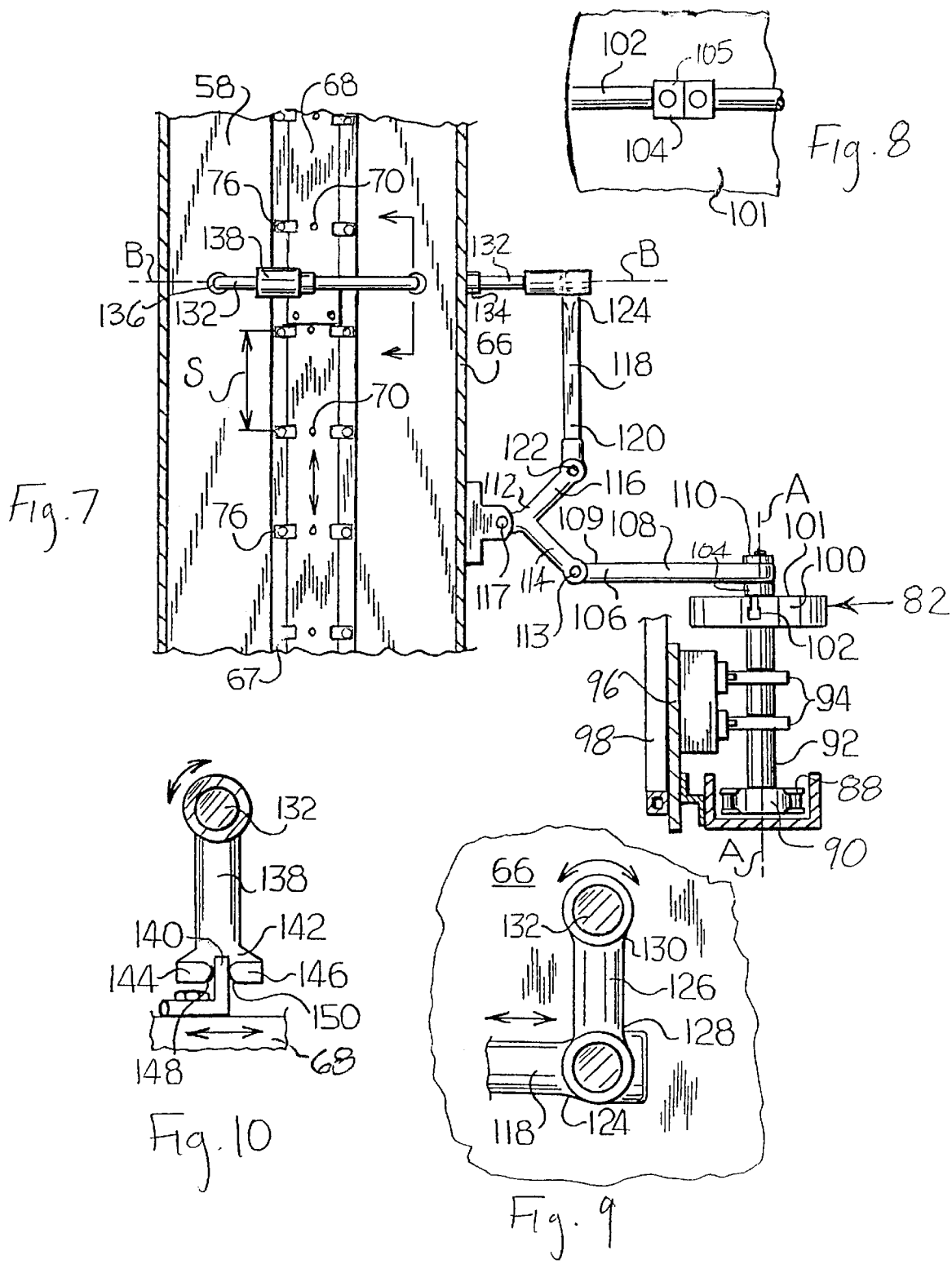

METHOD AND APPARATUS FOR SUBTERRANEAN IMPLANTATION OF A SOIL CONTAINER

CROSS-REFERENCE TO RELATED APPLICATIONS

Not applicable

BACKGROUND OF THE INVENTION

1. Field of the Invention

The present invention relates to a method and apparatus for implanting a soil conditioning substance into the soil underlying an existing surface of grass or turf.

2. Description of the Prior Art

It is known, particularly in the art of potting soils, that the addition of certain conditioning substances, such as water-absorbing polymers, to the soil can greatly enhance various properties of the soil including: water holding capacity and availability; aeration; friability; flocculation; permeability; and reduced compaction. A principal benefit stems from the fact that water absorbed by the polymer in the soil is time released back to the soil which results in increase in the time interval between required application of water by 30 to 50 percent.

The use of a soil conditioner such as a water-absorbing polymer in the maintenance of turf and grass surfaces, such as found in golf courses and athletic fields, would present numerous advantages. In addition to increasing the time interval between required watering, saving labor costs, the availability of the water in the soil as needed by the grass or turf surface would also result in more efficient use of water and reduction in the amount of water expended in maintenance of the grass or turf surface during a given period of time. In addition to water and labor cost savings, the addition of such a polymer to the soil beneath a grass or turf surface would result in other benefits including the reduction of sports related injuries resulting from reduction of turf compaction. Furthermore, the aerification resulting from the application of the water-absorbing polymer results in a more oxygenated root zone leading to healthier root development and growth for the turf or grass surface.

However, the introduction of a soil conditioner such as a water-absorbing polymer into the soil underlying an existing surface of turf or grass presents difficulties not found in the art of potting soil into which the polymer is mixed prior to placement of the plant life to be sustained by the potting soil. The appearance of the existing turf or grass surface is likely to be a paramount consideration, particularly for example the greens areas of a golf course. Visible destruction of the grass or turf surface in order to implant the water-absorbing polymer into the underlying soil would be unacceptable. The present invention provides a solution by creating access to the underlying soil for implanting a soil conditioner such as a water-absorbing polymer while restricting perceptible disturbance of the grass or turf surface.

SUMMARY OF THE INVENTION

According to the present invention there is provided a tool for implanting a conditioning substance into the soil beneath a surface of grass or turf. The tool includes: a plurality of spaced apart and generally vertically oriented blades, each of said blades capable of penetrating the surface and forming a deep notch which extends to soil underlying the surface, each of said blades further having a thickness sufficiently small to limit perceptibility of said deep notch; and a dispensing system for releasing the substance into the deep notches formed by said blades, said dispensing system having a plurality of ejection ports each of which is aligned with one of said blades such that the ejection port is positionable in the deep notch formed by said blade for delivery of the substance.

BRIEF DESCRIPTION OF THE DRAWINGS

These features and advantages of the present invention as well as others will be more fully understood when the following description is read in light of the accompanying drawings in which:

FIG. 7 is a partial top view of the tool of FIG. 1 illustrating the feed bar drive system;

FIG. 8 is a partial elevational view of the drive wheel of the feed bar drive system of FIG. 7;

FIG. 9 is a partial elevational view of the feed bar drive system of FIG. 7 illustrating the connection of the torque arm to the transverse shaft and to the parallel drive bar; and FIG. 10 is a partial elevational view of the feed bar drive system of FIG. 7 illustrating the connection of the swing arm to the transverse shaft and to the feed bar.

DETAILED DESCRIPTION OF THE PREFERRED EMBODIMENT

Figure 3:
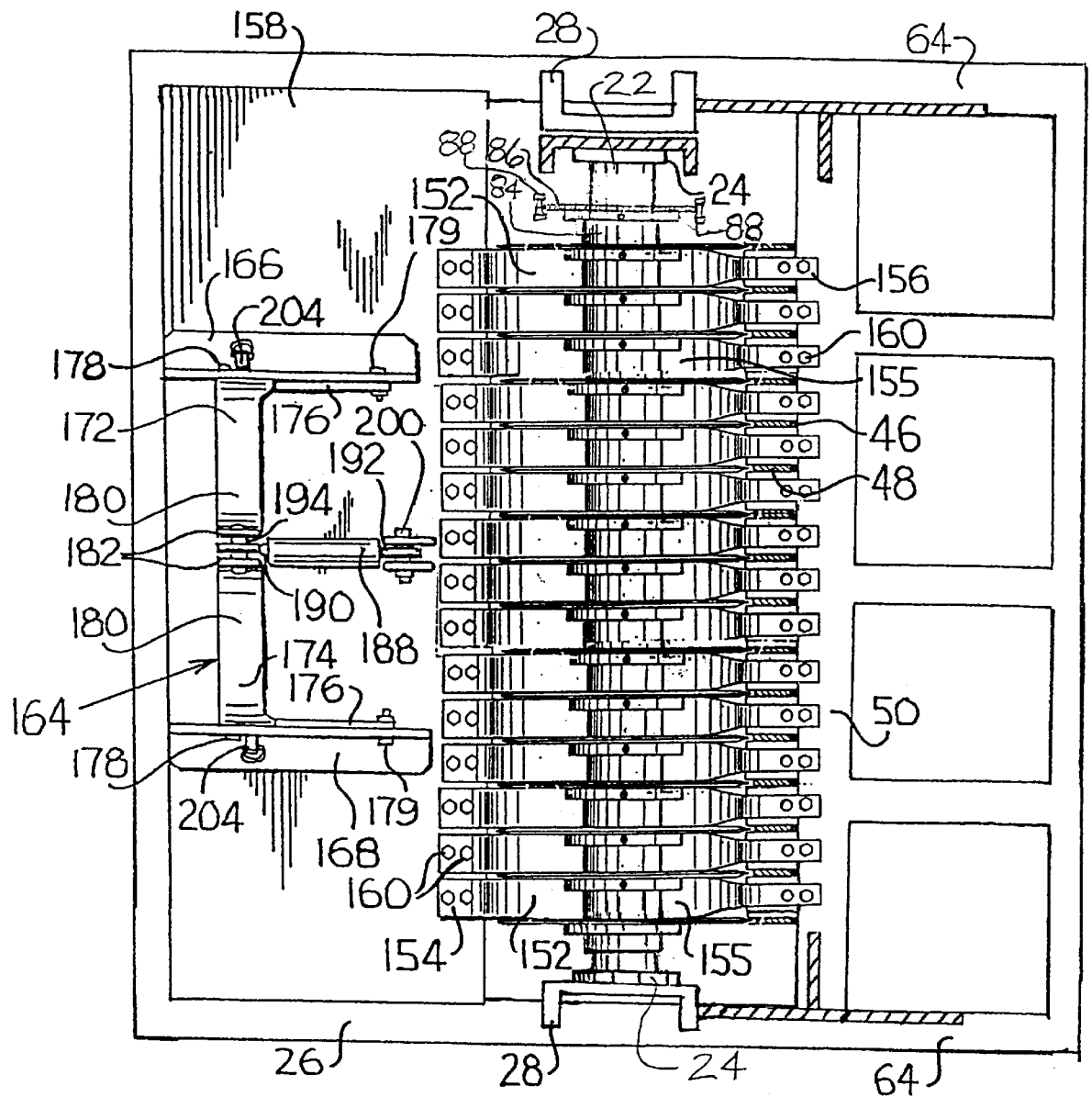
FIG. 3 is a top view of the tool of FIG. 1 with the trough-shaped container and feed bar drive system removed for clarity of view.

Referring to the figures there is illustrated an apparatus 10 for implanting a soil conditioning substance 12, such as the moisture absorbent polymer sold by Horticultural Alliance, Inc. of Sarasota, Fla. under the trademark HORTA-SORB™, into the soil 14 beneath a surface of grass or turf 16. The apparatus 10 includes spaced apart disc-shaped blades 18 having a tapered section 19 along an outer periphery thereof to form deep notches 20, seen in FIG. 4, extending through the surface 16 to the soil 14. As best seen in FIG. 3, the blades 18 are narrow in thickness such that the corresponding deep notches 20 formed by the blades are restricted in 16 thickness. In this manner, the perceptibility of the deep notches formed by the apparatus will be minimized thereby limiting detraction in the appearance of the surface 16 of grass or turf after implantation of the conditioning substance 12 into the underlying soil 14.

Figure 4:
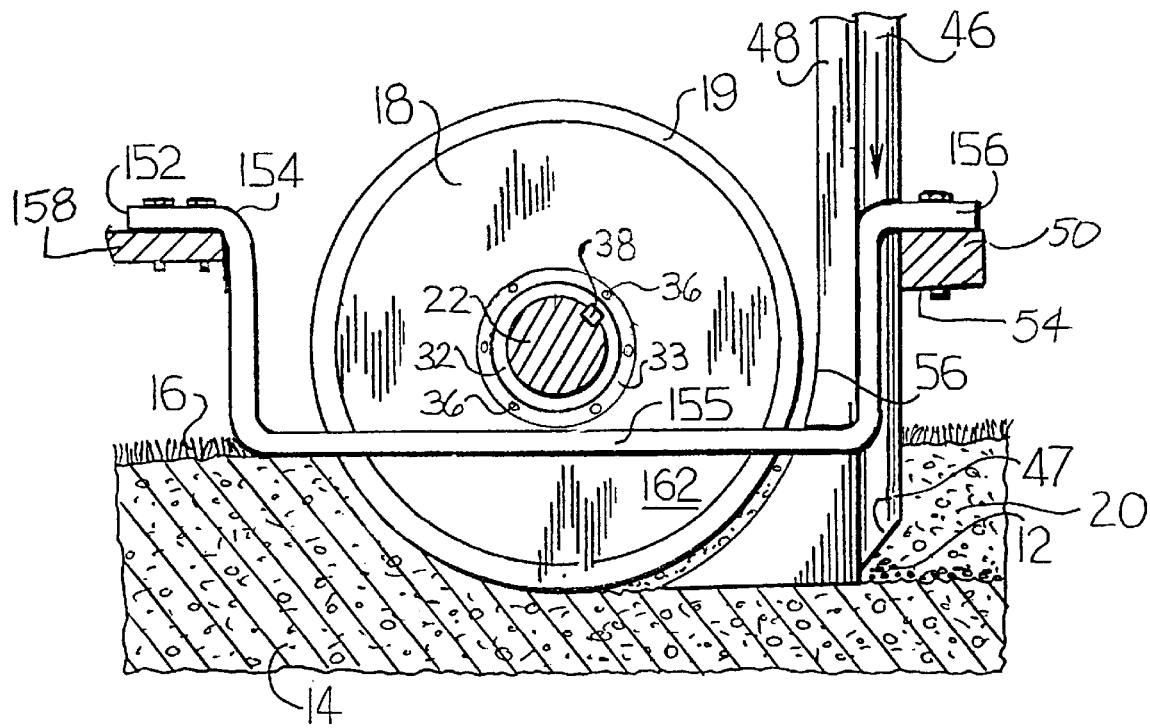
FIG. 4 is a partial elevational view in section of the tool of FIG. 1 illustrating the arrangement of the blades and the tubes.
Figure 6:
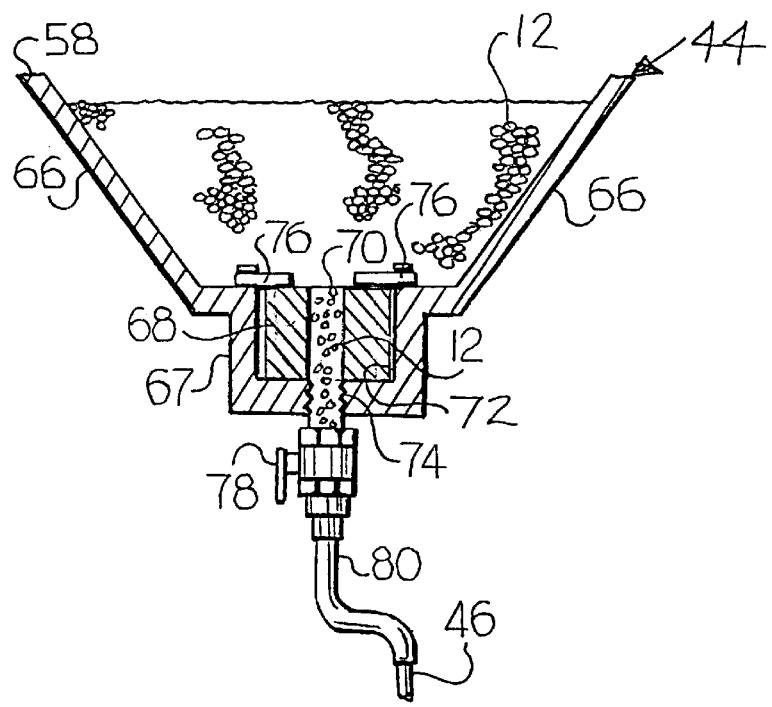
FIG. 6 is a partial elevational view in section of the dispensing system of the tool of FIG. 1.
Figure 5:
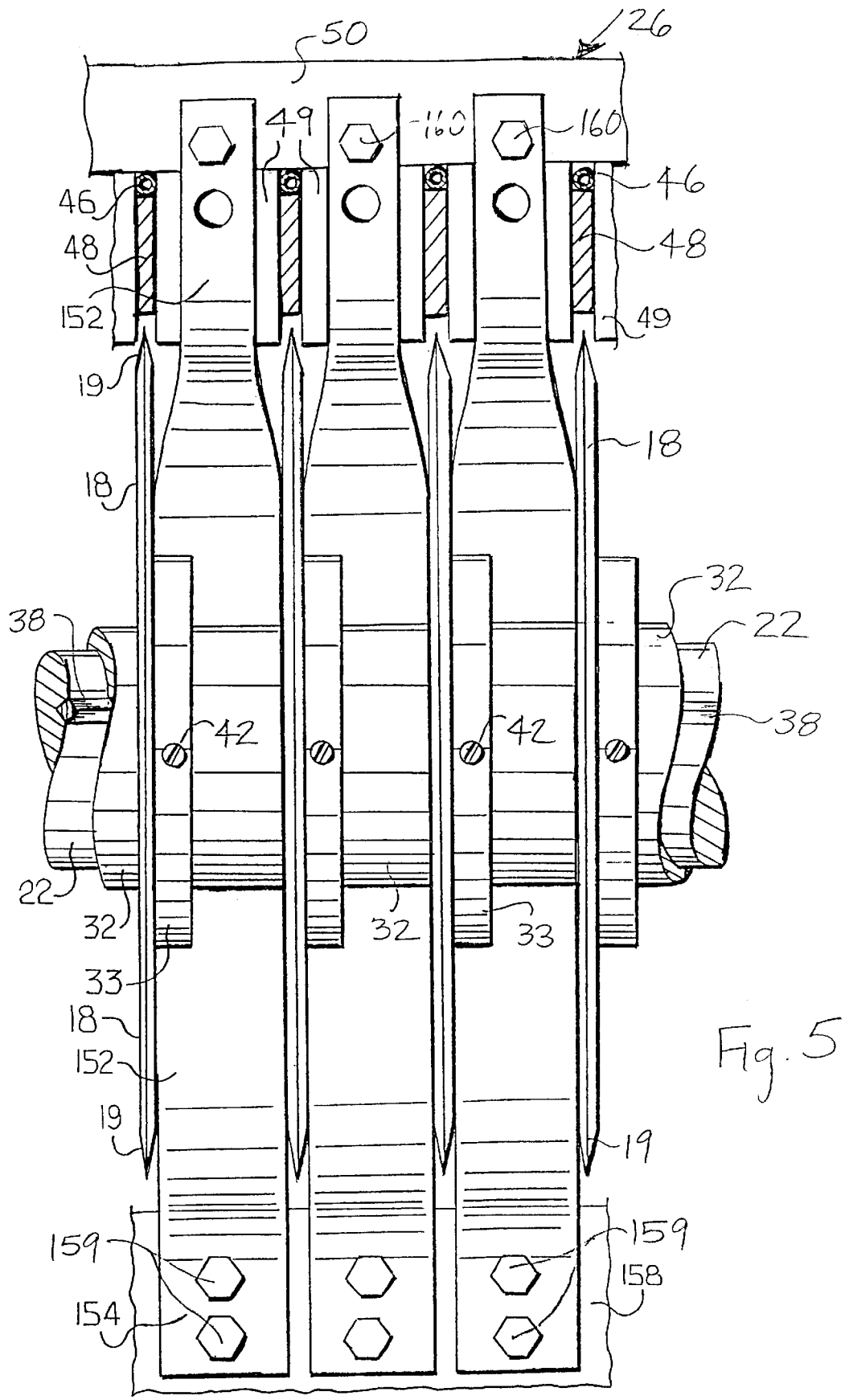
FIG. 5 is a partial top view of the tool of FIG. 1 illustrating the arrangement of the blades and the tubes.

Referring to FIGS. 3–5, the blades 18 are rotatably supported by the apparatus 10 in the following manner. The apparatus includes an elongated blade shaft 22 rotatably supported ills at opposite ends by bearings 24. The bearings 24 are mounted to a support 28 which is secured to a frame assembly 26. Elongated slots 30 in support 28 allow for vertical adjustment in the position of blade shaft 22 with respect to the apparatus 10 for controlling the distance that deep notches 20 extend into the soil 14 and to provide the option of retraction of the blades 18 for protecting the tapered sections 19 during non-use transportation and storage of the apparatus 10. The apparatus includes collars 32, one for each of blades 18, on which the blade is slidably received in a central opening 34 of blade 18. The blade 18 is secured to a flange 33 of collar 32 by fasteners 36. Each of collars 32 is in turn slidably received on blade shaft 22 and is rotationally secured thereto by a key 38 received in opposite slots in blade shaft 22 and collars 32. The axial position of each of the collars 32 with respect to the blade shaft 22 is secured by a set screw 42.

The apparatus 10 includes a dispensing system 44, best seen in FIGS. 1, 2 and 4–6, for delivery of the substance 12 into the deep notches 20 created by blades 18. The dispensing system 44 includes tubes 46 having terminal ends 47 defining ejection ports for delivery of the soil conditioning substance 12 into the deep notches 20 formed by blades 18. Each of the tubes 46 is secured to an edge of a tube support plate 48 which is in turn located between a pair of mounting plates 49 extending from member 50 of frame assembly 26 and suitably secured thereto, as with fasteners, such that the terminal end 47 of tube 46 extends beyond the bottom 54 of frame assembly 26. As best seen in FIG. 5, the tubes 46 are spaced apart and located with each of the tubes aligned with one of the blades 18 such that after the blade 18 forms a deep notch 20, the aligned tube 46 will be positioned in the deep notch for delivery of the substance 12 to the deep notch through terminal end 47 of tube 46. Each of the tube support plates 48 has a curving edge portion 56, best seen in FIG. 4, opposite tube 46 having a radius which matches the radius of the blades 18 such that the curving edge portion 56 confronts at a short distance the tapered section 19 of one of the blades 18. In addition to supporting the tubes 46, the support plates 48 serve to maintain the deep notches 20 formed by blades 18 thereby protecting the terminal ends 47 of tubes 46 from becoming clogged with soil. To further protect against clogging, the terminal ends 47 are beveled to slope upwardly away from the tube support plates 48.

Referring to FIGS. 1–2 and FIGS. 6–7, the dispensing system 44 also includes a trough-shaped container 58 having a removable cover 60 for housing a supply of the moisture absorbing substance 12. As seen in the cut-away portion of FIG. 2, the cover 60 includes a gasket recess 60A about an outer periphery in which a gasket 60B is positioned for providing a watertight seal when cover 60 is positioned on trough 58. A cover having a seal is preferable to prevent untimely contact of moisture with the soil conditioning substance 12 in trough 58 which could hinder the delivery of substance 12 by dispensing system 44 into notches 10. The cover 60 is secured to trough 58 by bolts 61. The container 58 is supported at opposite sides above the frame assembly 26 by upstanding support plates 62 which are secured to opposing members 64 of the frame assembly 26. The container 58 includes end walls 65 and angled side walls 66 which extend to bottom member 67. A feed bar 68 having openings 70 spaced apart at a spacing, S, along the length thereof is slidably supported by bottom member 67 in a channel 72 having openings 74 also spaced apart at a spacing, S, along the bottom thereof such that openings 70 of feed bar 68 may be brought into and out of confronting relationship with openings 74 of channel 72 through reciprocating sliding of feed bar 68 within channel 72 to be discussed in greater detail. The feed bar is maintained within the channel by spaced apart keeper tabs 76 which are secured to the bottom member 67 at opposite sides of channel 72. The openings 74 in the bottom of channel 72 are equal in number to the number of tubes 46 underlying container 58 and have a spacing, S, which is equal to the spacing of the tubes 46. A ball valve 78 is secured to the lower side of bottom member 67 at each of openings 74 such that flow of substance 12 from the bottom container 58 caused by gravity forces can be prevented regardless of the position of openings 70 of feed bar 68 with respect to openings 74 of channel 72. A flexible connector 80 connects each of ball valves 78 with an upper end of one of tubes 46.

Referring to FIGS. 7–10, the apparatus 10 includes a feed bar drive assembly 82 which links the blade shaft 22 with feed bar 68 such that rotation of the blade shaft results in reciprocating sliding of the feed bar. The reciprocating sliding of feed bar 68 results in openings 70 and 74 of feed bar 68 and channel 72, respectively, periodically being brought into and out of communication with one another such that delivery of substance 12 into deep notches 20 is periodically and alternately enabled and prevented. A collar 84 is mounted on blade shaft 22, in a similar manner as collars 32, near an end of blade shaft 22 and supports a gear member 86. A drive chain loop 88 engages teeth of gear member 86 as well as teeth of a gear member 90 mounted on an end of a feed bar drive shaft 92. The drive shaft 92 is rotationally supported by spaced apart bearings 94 mounted to a plate 96 which is welded to crossbars 98 extending between upstanding support plates 62.

A drive wheel 100 having a mounting surface with stepped slot 102 extending along a diagonal thereof is secured to an end of drive shaft 92 opposite gear member 90. A mounting block 104 is secured to wheel 100 in slot 102 in mounting surface 101 such that a mounting portion 105 of block 104 is located eccentrically with respect to an axis of rotation, A, of wheel 100. A first end 108 of a transverse drive bar 106 is rotationally secured to the mounting portion 105 of block 104 through a universal joint 110. The transverse drive bar 106 is oriented transversely and generally perpendicularly with respect to axis of rotation, A. A second end 109 of transverse drive bar 106 is pivotally connected to arm 114 of rocker member 112 by pin joint 113. The rocker member 112 is pivotally supported by one of side walls 66 of container 58 by pin joint 117 which is welded to side wall 66. A first end 120 of a parallel drive bar 118 is pivotally connected to arm 116 of rocker member 112 by pin joint 122. Parallel drive bar 118 is oriented generally parallel with respect to axis of rotation, A.

As drive wheel 100 and block 104 are rotated about axis of rotation A by drive shaft 92, the transverse drive bar 106 is directed towards and away from the container 58. As a result of the translation of transverse drive bar 106, rocker member 112 is pivoted about pin joint 117. An arm 116 of rocker member 112 is oriented with respect to rocker member 112 such that pivoting of rocker member 112 results in translation of parallel drive bar 118 back and forth along a length of container 58. The back and forth translation of parallel drive bar 118 results in pivoting of a torque arm 126 about an axis of rotation, B, through connection of end 128 of torque arm 126 to clevis end 124 of parallel drive bar 118.

An end 130 of torque arm 126 is secured to a transverse shaft 132 which spans across container 58 between opposite rotational supports 134 and 136 providing for pivot of shaft 132 as torque arm 126 is pivoted about axis of rotation, B. The axis of rotation, B, of transverse shaft 132 is generally perpendicular with respect to the axis of rotation, A, of drive shaft 92. A swing arm 138 is secured at a first end to shaft 132 at an intermediate point between supports 134 and 136 and has an opposite forked end 142 engaging a projecting tab 140 secured to feed bar 68 to reciprocate feed bar 68 in channel 72 as swing arm 138 is pivoted by shaft 132.

Members 144 and 146 of forked end 142 have opposing surfaces 148 and 150 which are rounded to allow for angulation between the pivoting swing arm 138 and the reciprocating feed bar 68.

Referring to FIGS. 3–5, the apparatus 10 includes a set of closely spaced plates 152 which are located between adjacent ones of blades 18. The plates 152 are attached forwardly of blades 18 at ends 154 to a plate 158 secured to an upper surface of frame assembly 26 by fasteners 159 and rearwardly of blades 18 at ends 156 to the upper surface of frame assembly 26 by fasteners 160. The closely spaced plates 152 are formed such that intermediate sections 155 are downwardly located with respect to the upper surface of frame assembly 26 to which the plates are attached. Peripheral portions 162 of blades 18 extend beyond plates 152 and form deep notches 20 extending to the soil 14. The width of the spaces between the plates 152 should be sufficiently large so that blades 18 are free to rotate between the closely spaced plates 152. The closely spaced plates 152 serve to hold down the grass or turf surface 16 as it is cut by blades 18 so as to prevent lifting of the grass or turf surface away from the underlying soil 14 as the blades penetrate the grass or turf surface. The closely spaced plates also serve to remove excessive clinging soil or sod which may build up on the peripheral portions 162 of blades 18 thereby facilitating further cutting by the blades 18.

Figure 1:
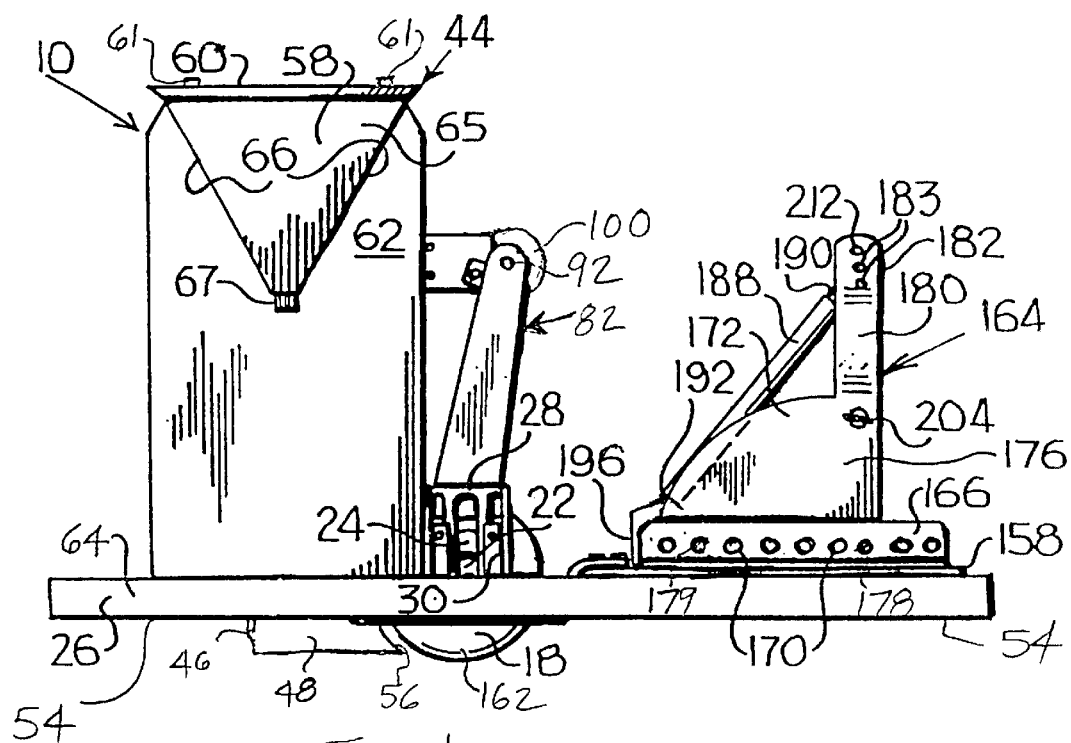
FIG. 1 is a side elevational view of an apparatus according to the present invention for implanting a soil conditioning substance beneath a grass or turf surface.
Figure 2:
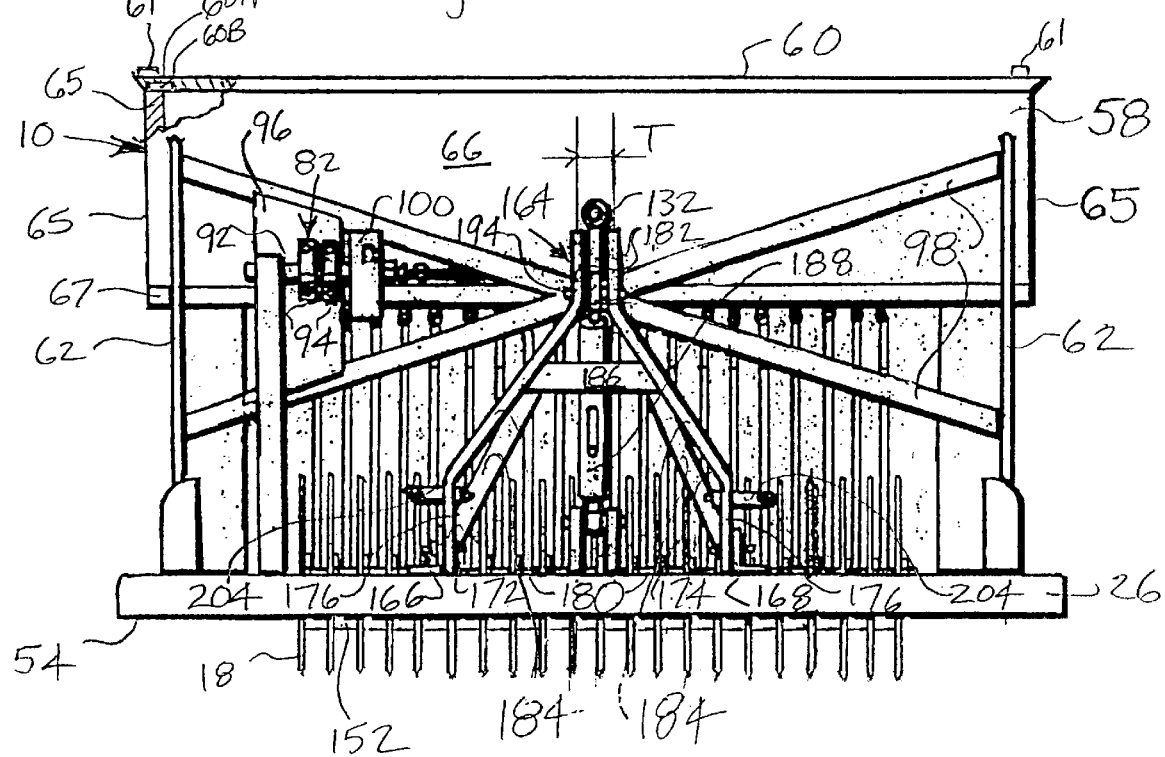
FIG. 2 is an end elevational view of the tool of FIG. 1.

Referring to FIGS. 1–3, the apparatus 10 includes a hitch assembly 164 secured to plate 158 adjacent the forward end of frame assembly 26 which is used for operational towing of the apparatus 10 behind a tractor, for example, as well as for hoisting of the rearward end of the apparatus by pivoting of the apparatus about the forward end for protection of the blades during non-operational transport of the apparatus. A pair of angle irons 166 and 168 are welded to plate 158 and have openings 170 spaced along their lengths to provide for forward and rearward adjustability of positioning of the rest of the hitch assembly secured to the angle irons with respect to the apparatus.

The hitch assembly further includes opposing arm members 172 and 174 each having an upstanding attachment portion 176 secured to one of angle irons by fasteners 178 and 179 secured to two of openings 170. Arm members 172, 174 further include sloping portions 180 which upwardly approach one another from the upstanding attachment portions 176 and extend to upstanding top portions 182 spaced from one another at a distance, T, having spaced apart openings 183. Brace members 184 extend from the attachment portions 176 to the sloping portions 180 of each of arm members 172, 174 to strengthen each of the arm members. Cross members 186 extend between the sloping portions 180 of arm members 172, 174 on opposite sides of brace members 184 to strengthen the upper portion of the hitch assembly as well as to maintain the spacing, T, between the top portions 182 of arm members 172,174.

A first end 190 of an adjustable strut 188 is located between, and secured to, opposing openings 183 of top portions 182 of arm members 172, 174 by pin fastener 194. A second end 192 of an adjustable strut 188 is located between, and secured by a pin fastener 200 to, opposing openings in upstanding mounting plates 196 and 198 which are welded on a rearward portion of plate 158. The strut resists moment created by the weight of the apparatus 10 having a center of gravity at a distance from the three lift points on arm members 172 and 174.

The hitch assembly 164 further includes lift pins 204 secured to openings in each of upstanding attachment portions 176 of arm members 172, 174. The lift pins 204 extend outwardly from the upstanding attachment portions 176 to provide two lifting points in a three-point lift arrangement. The top portions 182 of arm members 172, 174 provide for the third lift point of the three-point lift arrangement to which suitable attachment can be made through opposing openings 212 adjacent the terminal ends of top portions 182.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An apparatus for implanting a conditioning substance into soil, said apparatus including:

a plurality of spaced apart and generally vertically oriented blades capable of penetrating soil bearing grass or turf and forming spaced apart notches in the soil thereof; and a dispensing system including a plurality of tubes each having a terminal end defining one of a plurality of ejection ports each aligned with one of said blades such that the ejection ports are positionable in notches formed in soil by said blades for releasing a conditioning substance into the notches, said terminal ends of said plurality of tubes being beveled to angle rearwardly upwardly with respect to said blades for protecting said ejection ports against soil blockage, a container for the conditioning substance, said container includes a feed bar having a plurality of spaced apart openings which is slidably received in a channel having a plurality of spaced apart openings such that reciprocation of said feed bar in said channel results in the respective openings of said feed bar and said channel being brought into and out of an overlying relationship with one another thereby enabling and disabling a flow of said conditioning substance from said container to said plurality of tubes.

2. The apparatus according to claim 1 wherein said plurality of blades are disc-shaped blades rotatably supported by said apparatus.

3. The apparatus according to claim 2 further including spaced apart plates extending between said disc-shaped blades for contact with said grass or turf surface to maintain the position of the grass or turf surface with respect to the soil on which it is supported while said blades penetrate the surface to form said deep notches.

4. The apparatus according to claim 1 wherein said blades are secured to a blade shaft which is rotatably supported by said apparatus and wherein the apparatus further includes a feed bar drive assembly operably linking said blade shaft to said feed bar such that rotation of the blade shaft results in reciprocated sliding of said feed bar in said channel and periodic enabling and disabling of a flow of said substance from said container to said plurality of tubes.

5. The apparatus according to claim 4 wherein said feed bar drive assembly includes: a drive shaft rotatably supported by the apparatus and operably secured to said blade shaft such that rotation of said blade shaft results in rotation of said drive shaft; a transverse drive bar with respect to an axis of rotation of said drive shaft which has a first end operably and rotatably secured to said drive shaft, the first end of said transverse drive bar located eccentrically with respect to the axis of rotation of said drive shaft such that rotation of said drive shaft results in a translation of said transverse drive bar which is transverse with respect to the axis of rotation of said drive shaft, the drive bar having an opposite second end which is operably connected to said feed bar such that said translation of said transverse drive bar results in said reciprocated sliding of said feed bar.

6. The apparatus according to claim 5 wherein said feed bar drive assembly includes a drive chain engaging gears secured to said blade shaft and said drive shaft for rotation of said drive shaft.

7. The apparatus according to claim 5 wherein said feed bar drive assembly includes a drive wheel having a mounting surface secured to an end of said drive shaft; a mounting block secured to said drive wheel, said mounting block having a mounting portion which is located eccentrically with respect to said drive shaft; a universal joint secured to the mounting portion of said mounting block and to which the first end of said drive bar is connected for said translation.

8. The apparatus according to claim 5 wherein the reciprocated sliding of said feed bar is in a direction generally parallel with the axis of rotation of said drive shaft and wherein said feed bar drive assembly further includes: a generally parallel drive bar with respect to the axis of rotation of said drive shaft; a rocker member pivotably secured to said apparatus and having first and second arms pivotably and respectively connected to the second end of said transverse drive bar and a first end of said generally parallel drive bar; a transverse shaft rotatably supported by opposing sidewalls of said container such that the transverse shaft has an axis of rotation which is generally perpendicular to the axis of rotation of said drive shaft, the transverse shaft located in an overlying relationship with respect to said feed bar; a torque bar having a first end pivotably connected to the second end of said generally parallel drive bar and an opposite second end secured to said transverse shaft; and a swing arm having a first end secured to said transverse shaft between the sidewalls of said container and an opposite second end operably connected to said feed bar such that pivot of said swing arm in response to pivot of the torque arm results in said reciprocated sliding of said feed bar.

9. The apparatus according to claim 8 wherein the feed bar includes a projecting tab secured thereto and wherein the second end of said swing arm includes a forked portion engaging the projected tab of said feed bar, the forked portion including opposing rounded surfaces in contact with said tab to allow for angulation between a pivoting swing arm and a reciprocating feed bar.

10. An apparatus for implanting a conditioning substance into soil, said apparatus including:
    a plurality of spaced apart and generally vertically oriented blades capable of penetrating soil bearing grass or turf and forming spaced apart notches in the soil thereof;
    a dispensing system for releasing a conditioning substance into the notches in the soil, a plurality of ejection ports each of which is aligned with one of said blades such that the ejection ports are positionable in the notches for delivery of the conditioning substance;
    a frame assembly to which said blades and said dispensing system are operably terminal end of a tube, such terminal end sloped upwardly away from said support plate to protect against clogging.

11. The apparatus according to claim 10 wherein said hoist assembly includes a strut for resisting moment created by the weight of said apparatus having a center of gravity at a distance from the three lift points of said hoist assembly, said strut having a first end located between said arm members and secured to said upstanding top portions and extending downwardly and rearwardly to a second end secured to said plate.

12. An apparatus for implanting a conditioning substance into soil, said apparatus including:
    forming spaced apart notches in soil bearing grass or turf;
    releasing a conditioning substance into the notches by a plurality of tubes each having a terminal end forming ejection ports positionable in notches;
    protecting said ejection ports against soil blockage by beveling said tubes to angle rearwardly upwardly when positioned in the notches; and
    enabling and disabling a flow of said conditioning substance from a container to said plurality of tubes by reciprocating a feed bar in a channel to bring respective openings in said feed bar and said channel into and out of an overlying relationship with one another.

* * * * *